Dec. 5, 1961 M. E. MUSSARD 3,012,153

DIODE CHARACTERISTIC NETWORKS

Filed May 23, 1960

INVENTOR
MARCEL E. MUSSARD

BY Melvin E. Frederick
ATTORNEY

United States Patent Office 3,012,153
Patented Dec. 5, 1961

3,012,153

DIODE CHARACTERISTIC NETWORKS

Marcel E. Mussard, Troinex-Geneva, Switzerland, assignor to Raytheon Company, Waltham, Mass., a corporation of Delaware Filed May 23, 1960, Ser. No. 31,096
12 Claims. (Cl. 307—88.5)

The present invention relates to diode characteristic networks and more particularly to networks having an extremely sharp diode characteristic.

Heretofore diodes have been used in compandor circuits for compression and expansion of input signals to the compandor and in other of many situations wherein the utilization of the diode characteristic is desirable. However, prior art diodes are subject to many disadvantages. For example, in many applications such as for example, in compandors the forward impedance of such diodes is undesirably high, the backward or reverse impedance is undesirably low, the knee in the diode characteristic is at best not sharp and in many cases is nonexistent, and the diodes are unstable and temperature sensitive.

Briefly, the invention comprises a conventional input diode, an amplifier connected to one terminal of the diode, a subtracting network connected between the other terminal of the diode and the input terminal of the amplifier, and means coupled to the subtracting network and the amplifier for providing a reference voltage.

The present invention comprises a network having an input characteristic similar to but extremely sharper than that of conventional diodes. The network of circuit functions in the same manner as a conventional diode with susbtantially improved characteristics such as low forward impedance, and improved temperature stability. Additionally, the knee in the voltage characteristic of the circuit is sharper.

These and other objects and features of the invention, together with their incident advantages, will be more readily understood and appreciated from the following detailed description of the preferred embodiments thereof selected for purposes of illustration and shown in the accompanying drawings, in which.

Figure 1:
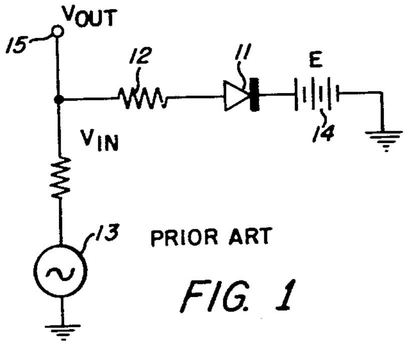
FIG. 1 is a schematic diagram representative of prior art diode circuits.

FIG. 1 shows by way of example the manner in which the characteristic of a diode is used in a compandor. One terminal of either a vacuum tube or semi-conductor diode 11 is coupled through a resistor 12 to the signal $V_{in}$ from a suitable source 13. The other terminal of the diode 11 is connected to a battery 14 or the like for supplying a reference voltage. As is well-known, when the magnitude of the input signal $V_{in}$ reaches the magnitude of the selected reference voltage from battery 14 the diode 11 will conduct and the output voltage is taken at terminal 15.

The characteristic of a conventional diode referred to immediately hereinabove is represented by the broken line in FIG. 2, and the characteristic of an ideal diode, representative of the characteristic of the present invention, is represented by the solid line, E being a positive value of the reference voltage.

It may be readily seen that the curve representative of the characteristic of an ideal diode has a sharp knee at the reference voltage, whereas conventional diodes do not as a practical matter have such a sharp knee. Further, the slope of the curve of the ideal diode approaches zero after the knee thereof whereas the curve of conventional diodes are generally arcuate with a substantial slope after this point.

Figure 2:
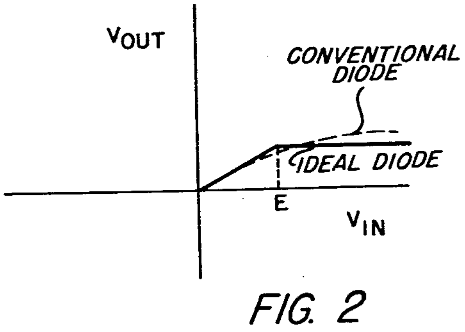
FIG. 2 is a graphic representation of the characteristics of conventional diodes and an ideal diode.
Figures 3, 4:
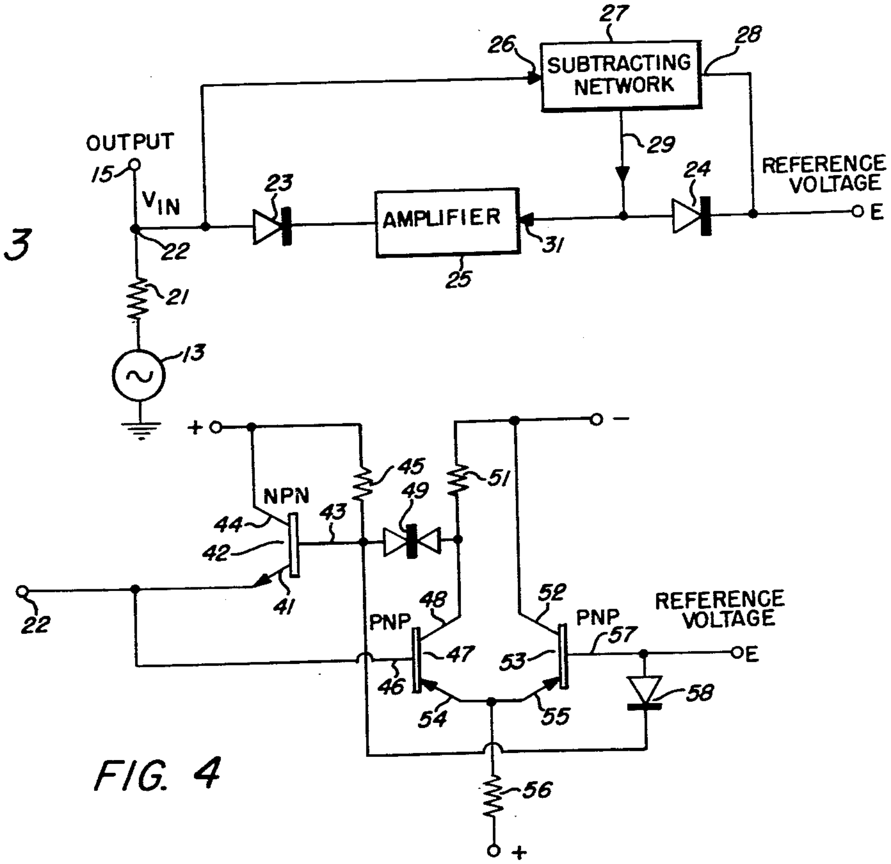
FIG. 3 shows the invention in block-diagram form.
FIG. 4 is a schematic diagram of an embodiment of the invention utilizing transistors.

The improved diode characteristic as represented by the solid line curve in FIG. 2 is obtainable in the manner shown in FIGS. 3 and 4.

With particular reference now to FIG. 3 there is shown means 13 for supplying an input signal, connected to output terminal 15 through a resistor 21 representative of the internal impedance of means 13. Serially connected between point 22 and a battery (not shown) for supplying a reference voltage E are two diodes 23—24 and an amplifier 25 connected therebetween. A first input terminal 26 of a subtracting network 27 is directly connected to point 22 and a second input terminal 28 of the subtracting network 27 is directly connected to the reference voltage E. The output terminal 29 of the subtracting network 27 is connected to the input terminal 31 of amplifier 25.

The basic network as shown in FIG. 3 is a feedback amplifier with diodes in the feedback path which cancel the feedback characteristics if the input voltage at point 22 drops below the reference voltage E. As with diodes there are two states of operation. The first state is when the input voltage at point 22 is greater than the reference voltage E and the second state is when the input voltage at point 22 is less than the reference voltage E. In the first case diode 24 is reversed biased and diode 23 is forward biased. In the second case diode 24 is forward biased and diode 23 is reversed biased. In the first case the network has a very low input impedance, namely $$Z_1 = \frac{R_f}{1+A}$$

where $R_f$ is the forward impedance of diode 23 and A is the amplification of the amplifier 25.

In the second case the network has a high input impedance; namely $$Z_2 = R_r$$

where $R_r$ is the reverse impedance of diode 23.

The voltage supplied to terminal 31 of the amplifier 25 by the subtracting network 27 is the reference voltage E minus the input voltage $V_{in}$ for the first case as shown in FIG. 3. Diode 24 functions to cancel the effect of the subtraction network 27 in the second case, i.e., where the input voltage $V_{in}$ is less than the reference voltage E, whereby the reverse voltage over diode 23 is limited to the input voltage $V_{in}$ less the reference voltage E.

A circuit diagram of a practical and operative embodiment of the invention utilizing transistors adapted for negative going input signals is shown in FIG. 4 to which reference is now made. As shown in FIG. 4, the emitter 41 of an NPN transistor 42 is connected to point 22, the base 43 being connected to the collector 44 through a resistor 45 which in turn is connected to a conventional source of positive bias voltage (not shown). The base 46 of the PNP transistor 47 is connected to the emitter 41 of transistor 42, the collector 48 of transistor 47 being connected through a Zener diode 49 to the base 43 of transistor 42. Collector 48 is also connected through a resistor 51 to the collector 52 of a PNP transistor 53 which in turn is connected to a source of negative bias voltage (not shown). The emitter electrodes 54—55 of transistors 47—53 are connected together and through a resistor 56 to a source of positive bias voltage (not shown). The base 57 of transistor 53 is connected to a source of reference voltage E which may if desired be adjustable. The base 43 of transistor 42 is also connected through a diode 58 to the reference voltage E.

Transistors 47—53 comprise and function as a differential amplifier to perform the subtraction and amplification function referred to hereinbefore. As may be seen by reference to FIG. 4 the base 57 of transistor 53 is connected to the reference voltage E on one side and the base 46 of transistor 47 is connected to the input voltage on the other side. The output of the differential amplifier is taken at the collector 48 of transistor 47 and is D.C. shifted by the Zener diode 49 and buffered by the transistor 42. As the emitter to base junction of transistor 42 is essentially a diode, it is used as a diode and is equivalent to diode 23 of FIG. 3.

Briefly, the present invention functions to drop the applied input signal at point 22 down to the desired level as determined by the reference voltage E by drawing more current through a diode, or as shown in FIG. 4 emitter 41 of transistor 42. Due to the impedance of the input signal source alone or to an impedance inserted in the input circuit this increased current causes the input voltage to drop to the desired level. The subtracting network 27 of FIG. 3 or the differential amplifier of FIG. 4 drives the amplifier 25 of FIG. 3 or the amplifier portion of transistor 42 as the case may be in such a direction as to compensate for any variations in the magnitude of the applied input signal. The reference voltage E is the voltage at which the "diode" or network is to conduct.

For the second case discussed hereinabove in connection with FIG. 4, the transistors 47 and 42 are both cut off thus providing a very high input impedance since the leakage currents of these transistors are both of the order of 1–10 microamperes at room temperature. Since transistors 47 and 42 are of opposite polarity their leakage currents subtract each other. For critical applications transistors 47 and 42 may be matched so that their leakage currents cancel each other to provide a backward or reverse impedance which is infinite for all practical purposes. In this instance the use of bilateral transistors will be of advantage as far as matching is concerned.

For the specific case when the reference voltage E is more negative than the applied or input voltage $V_{in}$ the base 57 of transistor 53 will be more negative than the base 46 of transistor 47, hence transistor 53 will be in a conducting condition and transistor 47 will be cut off. When transistor 47 is cut off transistor 42 is also cut off because of the coupling provided by the Zener diode 49. Diode 58 functions to limit the voltage across transistor 42 to provide a limitation on the back bias voltage on the emitter-base portion thereof or diode 23 of FIG. 3. Although diode 58 may be omitted if desired this may result in a large back biased voltage on the diode portion of transistor 42 of such magnitude as to be detrimental thereto. As shown in FIG. 4 diode 58 is used to protect the diode portion of transistor 42.

When the reference voltage E is equal to the input or applied voltage $V_{in}$, transistors 47 and 53 share current through resistor 56 from the positive voltage supply connected thereto. Transistors 47 and 53 function as a differential amplifier and the signal at the collector 48 of transistor 47, which is amplified, is proportional to the difference between the input or applied voltage $V_{in}$ and the reference voltage E. The signal at collector 48 in conjunction with Zener diode 49 causes transistor 42 to conduct and the greater the difference between the input voltage and the reference voltage, the harder transistor 42 is driven and hence a larger amount of current flows through transistor 42. Transistor 42 provides current amplification in addition to that of the differential amplifier.

If desired, a battery or a network of resistors connected to suitable supply voltages may be substituted for the Zener diode. As was pointed out hereinbefore the circuitry as shown in FIG. 4 is suitable for negative going input signals. The circuitry of FIG. 4 may be easily modified for positive going signals by reversing the connections of diode 58, changing PNP transistors 47 and 53 to NPN transistors, changing NPN transistor 42 to a PNP transistor, and reversing the polarity of the bias voltages. The level of the positive and negative bias voltages are determined in conventional manner and depend, for example, on the type of transistors used, the level of the applied signal, the desired level of the reference voltage and the like.

Measurements of a network connected in accordance with that shown in FIG. 4 showed a forward dynamic impedance of 6.6 ohms at −0.01 volt and a reverse impedance of 5 megohms at +1 volt. A better reverse impedance as pointed out hereinabove may be obtained by matching transistors 47 and 42 and contrary to the characteristics of a conventional diode, the network is not sensitive to temperature variations because of the differential amplifier which compensates for variations of base-to-emitter voltage over temperature.

Although the present invention has application wherever a diode is desired with a sharp break in its characteristic in conjunction with stability of the breakpoint voltage over a wide temperature range, it is particularly useful in an instantaneous compandor as used for speech transmission in pulse-code modulation equipment where diodes are used to load the input signal if it exceeds certain reference levels. In such cases the requirements for stability of the forward bias of these diodes are so severe that conventional diodes can only be used if kept at constant temperature in an oven. Obviously, the present invention eliminates the necessity of such an expensive and space-consuming oven in addition to the control circuits, additional power supply and the like associated therewith.

While the present invention has been described in its preferred embodiment, it is realized that modifications may be made, and it is desired that it be understood that no limitations on the invention are intended other than may be proposed by the scope of the appended claims.

What is claimed is:

1. A network having a diode characteristic comprising: a first terminal for connection to a signal source and a second terminal for connection to a reference voltage; amplifier means having input and output terminals; diode means connected between said first terminal and said amplifier output terminal; and means connected between said first and second terminals for supplying a difference signal to said amplifier input terminal.

2. A network having a diode characteristic comprising: a first terminal for connection to a signal source and a second terminal for connection to a reference voltage; amplifier means having input and output terminals; diode means connected between said first terminal and said amplifier output terminal; and means connected between said first and second terminals for supplying a signal to said amplifier input terminal having a magnitude proportional to the difference between the magnitude of the signals at said first and second terminals.

3. A network having a diode characteristic comprising: a first terminal for connection to an applied signal and a second terminal for connection to a reference voltage; amplifier means having input and output terminals; diode means connected between said first terminal and said amplifier output terminal; and a subtracting network having two input terminals connected between said first and second terminals and an output terminal connected to said amplifier input terminal.

4. In a network having a diode characteristic the combination comprising: a first terminal for connection to a signal source and a second terminal for connection to a reference voltage; amplifier means having input and output terminals; diode means connected between said first terminal and said amplifier output terminal; means connected between said first and second terminals for supplying a signal to said amplifier input terminal having a magnitude proportional to the difference between the magnitude of the signals at said first and second terminals, and diode means connected between said amplifier input terminal and said second terminal.

5. In a network having a diode characteristic the combination comprising: a first terminal for connection to a signal source and a second terminal for connection to a reference voltage; amplifier means having input and output terminals; first diode means connected between said first terminal and said amplifier output terminal; means having input terminals connected between said first and second terminals and an output terminal connected to said amplifier input terminal for supplying a difference signal to said amplifier input terminal; and second diode means connected between said amplifier input terminal and said second terminal, said means for supplying a difference signal to said amplifier being ineffective for a predetermined relationship between the signals at said first and second terminals, the voltage across said first diode means being limited to substantially the difference between said signals at said first and second terminals.

6. In a network having a diode characteristic the combination comprising: a first terminal for connection to a signal source and a second terminal for connection to a reference voltage; amplifier means having input and output terminals; first diode means connected between said first terminal and said amplifier output terminal; means having two input terminals connected between said first and second terminals and an output terminal connected to said amplifier input terminal for supplying a difference signal to said amplifier input terminal effective to cause conduction of said amplifier for a predetermined polarity relationship between the signal at said first terminal and the voltage at said second terminal; and second diode means connected between said amplifier input terminal and said second terminal to cancel the effect of said difference signal when said predetermined polarity relationship is reversed.

7. A network having a diode characteristic comprising: a first terminal for connection to a signal source and a second terminal for connection to a reference voltage; a semiconductor device connected to said first terminal; a differential amplifier having input means connected between said first and second terminals; means for coupling the output of said differential amplifier to said semiconductor device; and bias means connected to said semiconductor devices for current flow therethrough.

8. A network having a diode characteristic comprising: a first terminal for connection to a signal source and a second terminal for connection to a reference voltage; a semiconductor device having an emitter collector and base electrode, said emitter electrode being connected to said first terminal; a differential amplifier having input means connected between said first and second terminals; means for coupling the output of said differential amplifier to the base electrode of said semiconductor device; and bias means connected to said semiconductor device for current flow therethrough.

9. In a network having a diode characteristic the combination comprising: a first terminal for connection to a signal source and a second terminal for connection to a reference voltage; a semiconductor device having an emitter, collector, and base electrode, said emitter electrode being connected to said first terminal; a differential amplifier having first and second input means each connected to respectively said first and second terminals; means for direct current shifting and coupling the output of said differential amplifier to the base electrode of said semiconductor device; and bias means connected to said semiconductor device for current flow therethrough.

10. In a network having a diode characteristic the combination comprising: a first terminal for connection to a signal source and a second terminal for connection to a reference voltage; a semiconductor device having an emitter, collector, and base electrode, said emitter electrode being connected to said first terminal; a differential amplifier having first and second input means each connected to respectively said first and second terminals; means for direct current shifting and coupling the output of said differential amplifier to the base electrode of said semiconductor device; bias means connected to said semiconductor device for current flow therethrough; and diode means connected between said base electrode and said second terminal.

11. In a network having a diode characteristic the combination comprising: a first terminal for connection to a signal source and a second terminal for connection to a reference voltage; a first semiconductor device having an emitter, collector, and base electrode, said emitter electrode being connected to said first terminal; second and third semiconductor devices comprising a differential amplifier having first and second input means each connected to respectively said first and second terminals; means for direct current shifting and coupling the output of said differential amplifier to the base electrode of said first semiconductor device; bias means connected to said semiconductor device and said differential amplifier for current flow therethrough; and diode means connected between said base electrode and said second terminal.

12. A network having a diode characteristic comprising: a first terminal for connection to a signal source and a second terminal for connection to a reference voltage; a first semiconductor device having an emitter, collector, and base electrode, said emitter electrode being connected to said first terminal; second and third semiconductor devices each having an emitter, collector, and base electrode, said emitter electrodes being connected one to another and said base electrodes being each connected to respectively said first and second terminals to form a differential amplifier; a Zener diode coupling the output of said differential amplifier to the base electrode of said first semiconductor device; bias means connected to said semiconductor device and said differential amplifier for current flow therethrough; and diode means connected between base electrode of said first semiconductor device and said second terminal.

References Cited in the file of this patent

UNITED STATES PATENTS

| | | |
|---|---|---|
| 2,850,627 | Moore | Sept. 2, 1958 |
| 2,875,332 | Luther | Feb. 24, 1959 |